(12) United States Patent
Kidder

(10) Patent No.: X9243
(45) Date of Patent: Nov. 14, 1835

(54) CISTERN, RESERVOIRS, VATS, &C.

(76) Inventor: Levi Kidder

Levi [illegible]

Letters Patent

The Schedule referred to in these Letters Patent and making part of
the same containing a description in the words of the said Levi
[illegible] himself of his improvement in making water proof cisterns
tanks reservoirs &c.

In the case of a cistern this is effected as follows. First he prepares a mould which is a hollow cyl-
inder made in several transverse sections about two feet long and
each transverse section in three or more longitudinal sections,
fastened together by hooks pins or other convenient means and
capable of being taken apart and removed at pleasure from the
place in which they are used. The cylinder or mould may be
of any length and diameter desired. Next a circular pit of suf-
ficient depth is excavated in the earth, in diameter greater than
the cylinder or mould by twice the required thickness of the cistern
wall to be built. If during the operation of excavating
much water has flowed into the pit it may be removed by pum-
ping or other means then a thick floor of cement mortar is laid
all over the bottom of the pit say six inches thick upon this floor
which should be level is set one of the transverse sections of the
cylinder or mould at equal distance all around from the sides
or surface of the pit and being so set it forms with the sides of
the pit a mould in which to cast the first section of the cistern
wall. If during this last operation the water has again flowed in
so as to be inconvenient, it may be again pumped out, which done
a strong mortar nearly fluid made of cement and the best sand
is cast compact between the cylinder and the sides of the pit
filling the space between them, and thus forming the first section
of the cistern wall. The water is now permitted to flow over
this section of the wall into the cistern that by its pressure it
may prevent the floor or bottom while in an unseasoned state from
being injured from the upward pressure of the water beneath.

If the water flow in [illegible] as too much to retard the operation of
building, it may be pumped or drawn in from any near fountain.
After this is done set up on the first and coinciding therewith and
a transverse section of the cylinder or mould, then as before cast
in compact another quantity of cement filling the space between
the cylinder and the sides of the pit thus making another sec-
tion of the wall which will be of course united to the first.
Water if necessary for the purpose mentioned above may be
again permitted to flow, or be pumped in, then add another section
of the cylinder and in the same way as at first make or cast an-
other section of the wall; and so continue the operation until the
wall is raised to the required height. As soon as the wall is
sufficiently hard the cylinder may be removed; but the water
must remain until the cement is so hard as not to break
by external pressure of the water. When the water flows in rap-
idly or when it is found necessary or a better way instead of
first pumping out the water and making the floor as above de-
scribed, the floor may be made by sinking the cement and spread-
ing it with a convenient instrument [illegible] on the bottom of the
pit in the water. The walls also may be [illegible] by casting
the cement in the water proceeding in all other respects as al-
ready described. Substantially as above specified this ap-
plicant makes reservoirs and other vessels and cellars for hou-
ses only varying the shape of the mould to suit circumstan-
ces and excavating the earth so that the sides of the pit shall
correspond with that shape. The principle claimed by
this applicant, is securing the bottoms and walls of cistern
Reservoirs and other vessels and of cellars for houses again
injury to which in a crude or unseasoned state in low wet
ground or other places, they are liable from the influx and in-
ternal pressure of water by allowing the water as the work ad-
vances to flow into the vessel or cellar and thus overcoming
and counteracting the external pressure of the water by the

United States Patent

Patent No.: X9243 external weight and pressure of the same fluid. Also the forming of the walls of such vessels and cellars, by casting them in a mould of which the earth or the wall of the pit constitutes one side and corresponding thereto a wall made of boards or other materials constituting the other sides.

Also the sinking of the [illegible] and forming the bottoms of the vessels, and of cellars and so much of the walls as may be necessary in the water Witnesses
G. R. J. Bowdoin
James Bowdoin Levi Kidder (828 words)

(Granted November 14. 1835)

Drawing not necessary see Patent 21st Jan. 1835